United States Patent
Ohashi et al.

(10) Patent No.: US 12,304,833 B2
(45) Date of Patent: May 20, 2025

(54) TUNGSTEN HEXAFLUORIDE MANUFACTURING METHOD, TUNGSTEN HEXAFLUORIDE PURIFICATION METHOD, AND TUNGSTEN HEXAFLUORIDE

(71) Applicant: CENTRAL GLASS COMPANY, LIMITED, Yamaguchi (JP)

(72) Inventors: Mitsuya Ohashi, Ube (JP); Takanori Hamana, Ube (JP); Takanori Ogata, Ube (JP); Ryuichi Nakamura, Ube (JP)

(73) Assignee: CENTRAL GLASS COMPANY, LIMITED, Yamaguchi (JP)

( * ) Notice: Subject to any disclaimer, the term of this patent is extended or adjusted under 35 U.S.C. 154(b) by 874 days.

(21) Appl. No.: 17/442,446

(22) PCT Filed: Mar. 19, 2020

(86) PCT No.: PCT/JP2020/012265
§ 371 (c)(1),
(2) Date: Sep. 23, 2021

(87) PCT Pub. No.: WO2020/196246
PCT Pub. Date: Oct. 1, 2020

(65) Prior Publication Data
US 2022/0153606 A1    May 19, 2022

(30) Foreign Application Priority Data

Mar. 25, 2019  (JP) ................... 2019-056044

(51) Int. Cl.
C01G 41/04    (2006.01)
B01D 3/14     (2006.01)

(52) U.S. Cl.
CPC ............... *C01G 41/04* (2013.01); *B01D 3/14* (2013.01)

(58) Field of Classification Search
None
See application file for complete search history.

(56) References Cited

U.S. PATENT DOCUMENTS

| 4,960,581 A | * | 10/1990 | Harada | .................. C01B 25/10 |
| | | | | 423/489 |
| 6,896,866 B2 | | 5/2005 | Kikuyama et al. | |
| 2003/0091498 A1 | | 5/2003 | Kikuyama et al. | |

FOREIGN PATENT DOCUMENTS

| JP | 2000-72442 | | 3/2000 | |
| JP | 2001-172020 | | 6/2001 | |
| JP | 2003238161 | * | 8/2003 | |
| JP | 2019-019024 | | 2/2019 | |
| WO | 2009032464 | * | 3/2009 | |
| WO | WO-2009032464 A1 | * | 3/2009 | ............. C01G 41/04 |

OTHER PUBLICATIONS

International Search Report issued May 19, 2020 in International (PCT) Application No. PCT/JP2020/012265.

* cited by examiner

*Primary Examiner* — Sheng H Davis
(74) *Attorney, Agent, or Firm* — WENDEROTH, LIND & PONACK, L.L.P.

(57) ABSTRACT

A tungsten hexafluoride manufacturing method of the present invention includes a reaction step of reacting tungsten containing arsenic or an arsenic compound with a gas of a fluorine element-containing compound so as to obtain a mixture containing tungsten hexafluoride and a trivalent arsenic compound, and a distillation step of distilling and purifying the mixture so as to separate and remove a fraction containing the trivalent arsenic compound and to obtain tungsten hexafluoride.

20 Claims, 1 Drawing Sheet

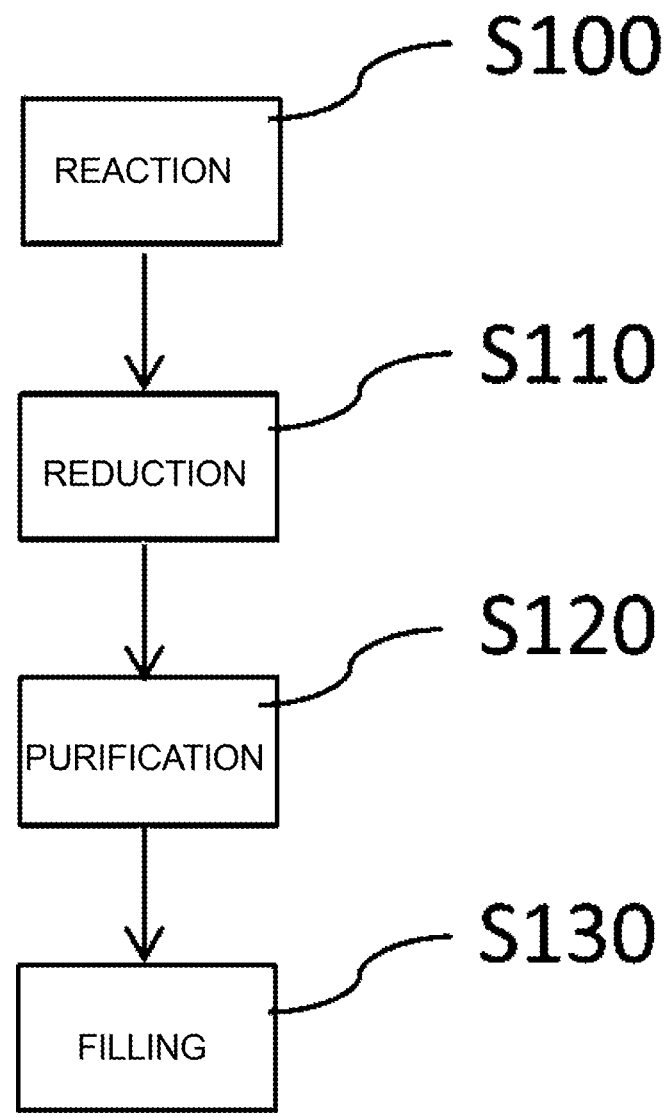

TUNGSTEN HEXAFLUORIDE MANUFACTURING METHOD, TUNGSTEN HEXAFLUORIDE PURIFICATION METHOD, AND TUNGSTEN HEXAFLUORIDE

TECHNICAL FIELD

The present invention relates to tungsten hexafluoride manufacturing method, a tungsten hexafluoride purification method, and tungsten hexafluoride.

BACKGROUND ART

Being a metal having a high melting point and low electric resistance, tungsten is widely used in the form of simple metal or tungsten silicide as a material for various electronic materials. Tungsten used in the field of electronic materials, especially in the field of semiconductors, needs to have high purity. As a method for obtaining high-purity tungsten, a CVD method using tungsten hexafluoride ($WF_6$) as a raw material gas is used.

Tungsten hexafluoride is usually manufactured by the reaction between metallic tungsten (W) and a fluorine gas ($F_2$). In a case where metallic tungsten containing arsenic as art impurity is used, tungsten hexafluoride containing arsenic impurity is manufactured.

As a technique for removing the arsenic impurity from tungsten hexafluoride, for example, the technique described in Patent Document 1 is known. Patent Document 1 describes a method of converting the arsenic impurity into arsenic pentafluoride and then removing the arsenic pentafluoride by a cooling and degassing operation (Examples in Patent Document 1).

RELATED DOCUMENT

Patent Document

[Patent Document 1] Japanese Unexamined Patent Publication No. 2003-238161

SUMMARY OF THE INVENTION

As a result of studies, the inventors of the present invention have revealed that the arsenic pentafluoride removing method described in Patent Document 1 can be further improved in terms of reducing arsenic compounds in tungsten hexafluoride.

As a result of studies, the inventors of the present invention obtained the following knowledge.

As a method for manufacturing tungsten hexafluoride by reacting tungsten with a gas of a fluorine element-containing compound, generally, the following step (1) or (2) is used.

$$W + 3F_2 \rightarrow WF_6 \qquad (1)$$

$$W + 2NF_3 \rightarrow WF_6 + N_2 \qquad (2)$$

Usually, a mixture containing tungsten hexafluoride manufactured by (1) or (2) contains an arsenic compound such as arsenic trifluoride or arsenic, pentafluoride. This arsenic compound is an impurity derived from arsenic (As) contained in the raw material metallic tungsten.

The boiling point of tungsten hexafluoride is 17.1° C., the boiling point of arsenic trifluoride is 63° C., and the boiling point of arsenic pentafluoride is −53° C. Therefore, generally, arsenic pentafluoride having a boiling point that is relatively greatly different from that of tungsten hexafluoride is considered to be more easily distilled and separated compared to arsenic trifluoride. That is, it is considered that in a case where tungsten hexafluoride containing arsenic trifluoride and arsenic pentafluoride is distilled, arsenic trifluoride having a high boiling point may remain in the distillation still, and arsenic pentafluoride having a low boiling point may be concentrated in the first fraction. In the aforementioned Patent Document 1 conceived based on the behavior of such an ideal solution system, studies are conducted on a method of converting all arsenic compounds into arsenic pentafluoride and removing the arsenic pentafluoride.

An object of the present invention is to provide a tungsten hexafluoride manufacturing method and a tungsten hexafluoride purification method for obtaining tungsten hexafluoride having a lower arsenic compound content.

As a result of detailed studies, the inventors of the present invention have revealed that in reality, the behavior of the arsenic compound in tungsten hexafluoride is different from the behavior of the ideal solution system.

That is, it has been found that in a case where tungsten hexafluoride containing a plurality of arsenic compounds is distilled, a trivalent arsenic compound such as arsenic trifluoride is concentrated in the first fraction.

On the other hand, it has been found that a pentavalent arsenic compound such as arsenic pentafluoride is difficult to separate by a distillation operation and remains in the distillation still.

Based on the above knowledge, the inventors of the present invention conducted intensive studies. As a result, the inventors have found that because a trivalent arsenic compound is concentrated in the first fraction in a case where a mixture containing tungsten hexafluoride and a trivalent arsenic compound is distilled and purified, by separating and removing the first fraction, it is possible to remove the trivalent arsenic compound to a high extent and to obtain a high-purity tungsten hexafluoride with a lower arsenic compound content.

According to the present invention,
there is provided a tungsten hexafluoride manufacturing method including a reaction step of reacting tungsten containing arsenic or an arsenic compound with a gas of a fluorine element-containing compound so as to obtain a mixture containing tungsten hexafluoride and a trivalent arsenic compound, and
a distillation step of distilling and purifying the mixture so as to separate and remove a fraction containing the trivalent arsenic compound and to obtain tungsten hexafluoride.

In the distillation step, the tungsten hexafluoride is obtained, for example, as a still residue.

Furthermore, according to the present invention,
there is provided a tungsten hexafluoride purification method including a distillation step of distilling and purifying a mixture containing tungsten hexafluoride and a trivalent arsenic compound so as to separate and remove a fraction containing the trivalent arsenic compound.

In addition, according to the present invention,
there is provided tungsten hexafluoride containing a trivalent arsenic compound,
in which a content of the trivalent arsenic compound is equal to or less than 100 ppb by mass with respect to a total mass of the tungsten hexafluoride.

According to the present invention, there are provided a tungsten hexafluoride manufacturing method and a tungsten hexafluoride purification method for obtaining tungsten hexafluoride with a lower arsenic compound content, and tungsten hexafluoride obtained using these methods.

BRIEF DESCRIPTION OF THE DRAWINGS

FIG. 1 is a view showing an example of a flow of a tungsten hexafluoride manufacturing process according to the present embodiment.

DESCRIPTION OF EMBODIMENTS

The tungsten hexafluoride manufacturing method of the present embodiment will be schematically described.

The tungsten hexafluoride manufacturing method of the present embodiment includes a reaction step of reacting tungsten with a gas of a fluorine element-containing compound, which contain arsenic or an arsenic compound so as to obtain a mixture containing tungsten hexafluoride and a trivalent arsenic compound, and a distillation step of distilling and purifying the mixture so as to separate and remove a fraction containing the trivalent arsenic compound and to obtain tungsten hexafluoride.

According to the knowledge of the inventors of the present invention, it has been revealed that a trivalent arsenic compound is concentrated in the first fraction obtained by distilling and purifying tungsten hexafluoride, and the first fraction contains the trivalent arsenic compound as a main component. Therefore, by separating and removing the first fraction obtained in the process of distillation and purification, it is possible to remove the trivalent arsenic compound contained in tungsten hexafluoride to a high extent. As a result, it is possible to purify and manufacture high-purity tungsten hexafluoride.

Furthermore, the reaction step in the manufacturing method of the present embodiment can also include a step of reacting tungsten with a gas of a fluorine element-containing compound, which contain arsenic or an arsenic compound so as to obtain an intermediate product containing a pentavalent arsenic compound and tungsten hexafluoride, and a step of bringing the intermediate product into contact with a reducing substance so as to converting at least a part of the pentavalent arsenic compound into a trivalent arsenic compound and to obtain the aforementioned mixture.

According to the knowledge of the inventors of the present invention, it has been revealed that in a case where the arsenic or arsenic compound contained as an impurity in the tungsten hexafluoride is brought into contact with a reducing substance so that the arsenic or arsenic compound is converted into a trivalent arsenic compound, the trivalent arsenic compound is concentrated in the first fraction of the distillation and purification, and the trivalent arsenic compound can be removed accordingly by separating and removing the first fraction. In a case where the step of converting the arsenic or arsenic compound into a trivalent arsenic compound is performed before the distillation step, it is possible to remove the arsenic or an arsenic compound to a high extent. Therefore, it is possible to purify and manufacture tungsten hexafluoride having higher purity.

Furthermore, because the trivalent arsenic compound concentrated in the first fraction includes not only the trivalent arsenic compound contained in the starting material but also the trivalent arsenic compound converted from the arsenic or arsenic compound, it is possible to efficiently remove impurities. Accordingly, it is possible to manufacture tungsten hexafluoride with high yield.

The tungsten hexafluoride purification method of the present embodiment includes a distillation step of distilling and purifying a mixture containing tungsten hexafluoride and a trivalent arsenic compound so as to separate and remove a fraction containing the trivalent arsenic compound. This purification method makes it possible to reduce the content of the trivalent arsenic compound in tungsten hexafluoride. Furthermore, the distillation method of the present embodiment can include, before the distillation step, a step of bringing an intermediate product containing a pentavalent arsenic compound and tungsten hexafluoride into contact with a reducing substance so as to convert the pentavalent arsenic compound into a trivalent arsenic compound and to obtain the mixture described above. In a case where the purification method includes this step, it possible to purify tungsten hexafluoride having higher purity.

The tungsten hexafluoride purification method of the present embodiment can provide tungsten hexafluoride to be used as a raw material gas for CVD for manufacturing high-purity tungsten powder useful as a sputtering target, a conductive paste material, and the like, or as a raw material gas for CVD for semiconductor manufacturing.

In a case where high-purity tungsten hexafluoride is used as a raw material gas for CVD for semiconductor manufacturing, it is possible to inhibit arsenic from being incorporated into a film formed by CVD. Arsenic is a semiconductor doping material. Therefore, removing arsenic from the film makes it possible to inhibit devices from being negatively affected by the diffusion of arsenic and the like.

Therefore, using the tungsten hexafluoride obtained by the manufacturing method of the present embodiment makes it possible to realize excellently reliable devices.

Hereinafter, each step of the tungsten hexafluoride manufacturing method of the present embodiment will be specifically described.

The tungsten hexafluoride manufacturing method of the present embodiment can include a reaction step (S100), a reduction step (S110), a purification step (S120), and a filling step (S130) which is an optional step. FIG. 1 shows an example of the flow of the steps (S100 to S130).

The tungsten hexafluoride manufacturing method of the present embodiment is not limited to the above steps. If necessary, one or two or more known operations, such as purification, collection, degassing, and liquid transfer, may be combined with the manufacturing method. One or more operations among the above may be performed multiple times. The order of performing the operations can be appropriately selected.

In the reaction step (S100), tungsten containing arsenic or an arsenic compound is reacted with a gas of a fluorine element-containing compound, which makes it possible to obtain an intermediate product containing a pentavalent arsenic compound and tungsten hexafluoride. In the reaction step, the reaction formula (1) or (2) described above can be adopted. Particularly, from the viewpoint of manufacturing stability, it is possible to use the reaction formula (1) in which metallic tungsten is reacted with a fluorine gas.

The intermediate product obtained by the reaction step (mixture gas containing tungsten hexafluoride) contains a tungsten hexafluoride compound and an impurity derived from the raw material metallic tungsten, an impurity derived from the fluorine gas, or an impurity intermixed in the manufacturing process. Examples of these impurities include a trivalent arsenic compound such as $AsF_3$ and a pentavalent arsenic compound such as $AsF_3$. The arsenic concentration in the raw material metallic tungsten may be, for example, 0.3 ppm by mass to 3 ppm by mass ppm in terms of arsenic atoms.

In the subsequent reduction step (S110), the mixture gas (intermediate product) containing tungsten hexafluoride obtained by Step 100 is brought into contact with a reducing substance. The step of bringing the intermediate product into contact with the reducing substance makes it possible to convert at least a part of the pentavalent arsenic compound contained in the intermediate product into a trivalent arsenic compound. That is, the pentavalent arsenic compound, such as arsenic pentafluoride, contained in the intermediate product can be reduced to a trivalent arsenic compound. Furthermore, in the above reduction step, it is possible to inhibit the reduction of tungsten hexafluoride while reducing the pentavalent arsenic compound.

The reduction step makes it possible to reduce at least a part of the pentavalent arsenic compound contained in the intermediate product into a trivalent arsenic compound, preferably ½ or more of the total amount of the pentavalent arsenic compound into a trivalent arsenic compound, and more preferably substantially the entirety of the pentavalent arsenic compound into a trivalent arsenic compound. The reduction of the pentavalent arsenic compound makes it possible to separate the pentavalent arsenic compound in the subsequent purification step (distillation step). Therefore, the pentavalent arsenic compound contained in the intermediate product can be efficiently removed.

The reducing substance can be appropriately selected in consideration of low reactivity with tungsten hexafluoride or high reactivity with a pentavalent arsenic compound, such as arsenic pentafluoride. For example, the reducing substance preferably includes one or more substances selected from the group consisting of tungsten, molybdenum, copper, nickel, iron, cobalt, zinc, titanium, aluminum, calcium, magnesium, phosphorus, and hydrogen. Each of these may be used alone, or two or more of these may be used in combination. Among these, from the viewpoint of handleability, a reducing metal, such as tungsten, molybdenum, copper, nickel, iron, cobalt, zinc, titanium, aluminum, calcium, or magnesium, is preferable. The reducing metal may be a metal compound containing the above metal as a main component. Metallic tungsten is preferable because this substance inhibits the reduction of yield of tungsten hexafluoride while inhibiting the intermixing of impurities.

The reaction temperature of the reducing substance and tungsten hexafluoride can be appropriately selected in consideration of the reactivity described above. For example, the reaction temperature can be about 100° C. to 500° C. In a case where the reaction temperature is equal to or higher than 100° C., the reduction reaction of the pentavalent arsenic compound, such as arsenic pentafluoride, can sufficiently proceed. In a case where the reaction temperature is equal to or lower than 500° C., it is possible to inhibit tungsten hexafluoride from being partially reduced and to realize high yield.

The shape of the aforementioned reducing metal is not particularly limited. For example, the reducing metal is in the shape of a lump, a plate, a rod, a granule, powder, mesh, or the like. From the viewpoint of large surface area, the reducing metal is preferably in the shape of powder. From the view point of using the reducing metal in a packed column, the reducing metal is preferably in the shape of a granule, a lump, or a rod.

The reducing metal and tungsten hexafluoride are brought into contact with each other, for example, by a method of causing tungsten hexafluoride (gas) to flow in a packed column filled with one or a plurality of reducing metals. It is preferable to use a packed column having a structure in which a short path is not made. The shape of the reducing metal with which the column is to be filled is appropriately selected in consideration of pressure loss. It is more preferable to use a reducing metal in the shape of a granule, a lump, or a rod, than to use a reducing metal in the shape of powder having a small particle size.

The linear velocity of the gas (tungsten hexafluoride) to flow in the packed column is preferably, for example, 10 cm/min to 100 cm/min (at 25° C.). In a case where the linear velocity is equal to or higher than the lower limit, it is possible to increase the throughput per unit time and to improve economic efficiency. In a case where the linear velocity is equal to or lower than the upper limit, it is possible to inhibit unreacted substances from remaining. Furthermore, it is possible to prevent the increase of the packing length in the packed column while inhibiting unreacted substances from remaining. Therefore, economic efficiency can be improved.

The empty bed contact time of the gas to flow in the packed column is not limited, but is preferably equal to or more than 1 minute and equal to or less than 5 minutes. In a case where the empty bed contact time is less than 1 minute, arsenic is not thoroughly reduced. In a case where the empty bed contact time is more than 5 minutes, tungsten hexafluoride may be reduced.

In tungsten hexafluoride manufacturing facilities using metallic tungsten and a fluorine gas, depending on the mode of reaction, unreacted fluorine is incorporated into the gas at the reactor outlet. The gas at the reactor outlet contains more arsenic pentafluoride than arsenic trifluoride. For example, in a case where a horizontal reactor having a space on the upper portion is used, unreacted fluorine makes a short path, and a fluorine gas is incorporated into the gas at the reactor outlet. The reduction step according to the present embodiment is effective for tungsten hexafluoride containing a large amount of arsenic pentafluoride.

In contrast, in a case where a packed column-type vertical reactor is used, a gas as a reaction product passes through a heated metallic tungsten layer before reaching the reactor outlet. Therefore, unreacted fluorine is reduced, and arsenic pentafluoride can be reduced to arsenic trifluoride. Furthermore, even though the vertical reactor is used, as the reaction with fluorine progresses, the packed bed of metallic tungsten grows shorter. Therefore, it is preferable to additionally install a packed column for reduction at the end portion of the reactor.

Nickel, Monel, or the like is used as the material of the packed column, piping, and the like.

By the aforementioned reaction step or by the reaction step and the reduction step, a mixture containing tungsten hexafluoride and a trivalent arsenic compound (tungsten hexafluoride mixture) is obtained.

Subsequently, the tungsten hexafluoride mixture (gas) may be collected into a collection container, and the collection container may be degassed. In this collection step, it is also possible to collect the gaseous tungsten hexafluoride into a collection container cooled to about −50° C. and to solidify the gas. Then, the gas layer in the upper portion of the collection container is removed by a vacuum pump. At this time, the inside of the collection container may be purged with an inert gas, such as helium, and degassed.

The tungsten hexafluoride mixture may be heated to about room temperature (for example, 25° C.) so that the mixture having turned into a liquid is collected.

In the subsequent purification step (S120), the tungsten hexafluoride mixture is distilled and purified, and a fraction containing a trivalent arsenic compound is separated and removed (purged) from the mixture (distillation step).

The aforementioned fraction includes the first fraction containing the concentrated trivalent arsenic compound. The aforementioned first fraction also includes the first fraction of refluxed tungsten hexafluoride.

Furthermore, in the purification step, the tungsten hexafluoride mixture obtained through the collection step and/or liquid transfer step described above may be distilled and purified.

As the distillation method, known distillation methods can be used. For example, any of a batch distillation method and a continuous distillation method is used. The distillation method can be used in combination with any of atmospheric distillation, distillation under reduced pressure (vacuum distillation), and pressure distillation.

An example of embodiments of the distillation step according to the present embodiment will be described.

The distillation apparatus includes a distillation still, a distillation column, a condenser, and a receiver (receiving tank). The distillation still, the distillation column, and the condenser are connected to each other.

The tungsten hexafluoride mixture (liquid) is transferred from the collection container to the distillation still. The collected tungsten hexafluoride mixture may be collected into another container and then transferred to the distillation still.

The distillation still heats the introduced tungsten hexafluoride mixture (liquid). The heating temperature of the distillation still can be adjusted to, for example, about 20° C. to 50° C. The heated tungsten hexafluoride (gas) moves to the distillation column.

The distillation column may be in the form of a packed column filled with a packing material, or in the form of a tray column provided with multiple trays.

The distillation column is not limited as long as it can cut the first fraction. It is preferable to use a distillation column for cutting low-boiling-point compounds generally used in industrial process. Any of distillation under reduced pressure, atmospheric distillation, and pressure distillation can be adopted as mode of distillation. The mode of distillation may be appropriately selected. From the viewpoint of energy saving, pressure distillation is preferable. The number of trays of the distillation column may be selected depending on the arsenic concentration of tungsten hexafluoride and the required product quality, which is about 5 to 50.

The packing material contained in the distillation column is not particularly limited as long as it is a known regular or irregular packing material. The packing material may be made of a metal, ceramic, or plastic, and is preferably made of an anticorrosive metal. From the viewpoint of low cost and ease of handling, a packing material made of nickel or SUS is more preferable. In a case where such a packing material is used, it is possible to inhibit intermixing of metal impurities in the process of distillation. For example, irregular packing materials in the form of a packing, a ring, a ball, and the like may be used.

The distillation column containing the packing material moves the tungsten hexafluoride (gas), which has moved in from the distillation still, to the condenser, and brings the tungsten hexafluoride (liquid) refluxed from the condenser into contact with the gas on the surface of the packing material.

The condenser is connected to the top of the distillation column. The condenser cools the tungsten hexafluoride (gas) that has passed through the distillation column, and returns (refluxes) the cooled tungsten hexafluoride (liquid) from the lower portion of the condenser into the distillation column.

The conditions of reflux described above can be appropriately controlled, for example, by adjusting the flow rate of a refrigerant in the condenser, the refrigerant temperature at the inlet and outlet, the internal temperature of the column top, the flow rate of a heat medium in the distillation still, and the like.

The internal temperature (° C.) of the condenser may be set to an appropriate temperature depending on the internal pressure of the condenser. For example, the internal temperature of the condenser is 5° C. to 100° C., preferably 10° C. to 70° C., and more preferably 20° C. to 50° C.

The first fraction is extracted from the upper portion of the condenser, in a state where the flow rate is being controlled using a flow meter. This fraction contains a trivalent arsenic compound such as arsenic trifluoride. By cutting (discarding) the first fraction, it is possible to obtain high-purity tungsten hexafluoride.

The cut first fraction is removed from the distillation apparatus via an exhaust gas pump.

Presumably, because the mixed solution containing tungsten hexafluoride behaves not as an ideal liquid but as a non-ideal liquid, a trivalent arsenic compound, such as arsenic trifluoride, may be concentrated in the first fraction, although the detailed mechanism is unclear.

The amount of the first fraction separated can be appropriately determined depending on the arsenic concentration in the mixture to be distilled. For example, the amount of the first fraction separated with respect to the feed amount of 100% by mass of the tungsten hexafluoride subjected to the distillation step is equal to or more than 0.1% by mass and equal to or less than 5% by mass, preferably equal to or more than 0.3% by mass and equal to or less than 3% by mass, and more preferably equal to or more than 0.5% by mass and equal to or less than 1.0% by mass. In a case where the amount of the first fraction separated is equal to or less than the upper limit, the yield of tungsten hexafluoride can be increased. In Step S110 which is a reduction step, a pentavalent arsenic compound is converted into a trivalent arsenic compound, and the trivalent arsenic compound is concentrated in the first fraction. In this way, the trivalent arsenic compound can be more efficiently removed by the separation and removal of the first fraction. That is, even though a small amount of the first fraction is cut, the arsenic compound can be thoroughly removed, and high-purity tungsten hexafluoride can be collected. In contrast, in a case where the amount of the first fraction separated is equal to or more than the lower limit, high-purity tungsten hexafluoride can be collected.

In the distillation step according to the present embodiment, it is possible to perform separation and removal of fractions for obtaining tungsten hexafluoride satisfying the following condition.

Condition: The upper limit of the content of a trivalent arsenic compound in tungsten hexafluoride obtained after separation and removal of fractions with respect to the total mass of tungsten hexafluoride is equal to or less than 100 ppb by mass, preferably equal to or less than 80 ppb by mass, more preferably equal to or less than 50 ppb by mass, even more preferably equal to or less than 10 ppb by mass, and still more preferably less than 1 ppb by mass. The lower limit of the content of the trivalent arsenic compound is not particularly limited, but may be, for example, equal to or more than 0.1 ppb by mass. The content of the trivalent arsenic compound is reduced as described above, which makes it possible to realize high-purity tungsten hexafluoride excellent in manufacturing stability of products.

In the present specification, "content of the trivalent arsenic compound" means a content expressed in terms of arsenic atoms. The same shall be applied to other parts of the present specification. "Arsenic concentration" also means a concentration expressed in terms of arsenic atoms.

After the first fraction is separated and removed, reflux is stopped. The tungsten hexafluoride in the distillation still is extracted in the form of a liquid into a receiver (receiving tank), or discharged in the form of a gas and collected into a receiver (receiving tank) having a condenser.

The arsenic concentration in the first fraction or in the collected tungsten hexafluoride can be measured by ICP-MS.

In Step S160, the tungsten hexafluoride collected after the distillation step (Step S150) is vaporized, and then a storage container is filled with the tungsten hexafluoride. The storage container may be filled with the collected tungsten hexafluoride by liquid transfer.

The storage container of the present embodiment is filled with the tungsten hexafluoride obtained by the purification method described above. The tungsten hexafluoride in the storage container can be stored as a liquid. In a case where the tungsten hexafluoride is stored in this way, storability and transport properties can be improved.

The storage container may include a metal container having an internal space, an inlet/outlet of tungsten hexafluoride provided in the metal container, and a valve provided at the inlet/outlet. The tungsten hexafluoride introduced from the inlet/outlet is stored in the internal space of the metal container. In a case where the tungsten hexafluoride is stored in this way, the handleability of the tungsten hexafluoride can be improved.

It is preferable that at least the inside (inner wall that comes into contact with tungsten hexafluoride) of the metal container of the storage container be made of an anticorrosive metal. Examples of the anticorrosive metal include nickel, a nickel-based alloy, stainless steel (SUS), manganese steel, aluminum, an aluminum-based alloy, titanium, a titanium-based alloy, platinum, and the like. Particularly, from the viewpoint of low cost and ease of handling, the metal container is more preferably made of nickel, such as nickel or a nickel-based alloy, or made of SUS. In a case where the metal container is made of these materials, it is possible to store and transport the tungsten hexafluoride while maintaining high purity.

Hitherto, the embodiments of the present invention have been described. However, the embodiments are merely examples of the present invention, and various configurations other than the above can also be adopted.

EXAMPLE

Hereinafter, the present invention will be specifically described with reference to examples, but the present invention is not limited to the description of the examples.

Example 11

A 25 mm (φ)×700 mm nickel packed column equipped with an external heater was filled with tungsten (a wire having a diameter of 5 mm and a length of 1 cm) as a reducing substance up to 650 mm, and heated to 350° C.

Subsequently, "tungsten hexafluoride containing a trivalent arsenic compound and a pentavalent arsenic compound as impurities" obtained by reacting a fluorine gas with "metallic tungsten containing an arsenic component as an impurity" was allowed to flow in the packed column, and then collected into a stainless steel collector cooled to −50° C. After about 10 kg of tungsten hexafluoride was allowed to flow in the packed column, the inside of the collector was degassed in a vacuum at a temperature of −50° C.

Then, the internal temperature of the collector was returned to room temperature so that the mixture (gas) containing tungsten hexafluoride turns into a liquid, and then the liquid was transferred to distillation facilities equipped with a distillation column having a column diameter of 40 A and a length of 1,200 mm. As a packing material for the distillation column, 6 mm (φ)×6 mm stainless steel Raschig rings were used. A distillation still and a condenser were installed at the column top and the column bottom respectively, and a gaseous first fraction was extracted from the condenser at the column top, in an amount of 1.5% by mass with respect to the feed amount of the tungsten hexafluoride (100% by mass), thereby removing arsenic compounds. Distillation was performed under the conditions of heating the distillation still with warm water at 35° C., cooling the condenser with cooling water at 15° C., and controlling the reflux rate at 200 g/min.

As a result, while the arsenic concentration in the collector before distillation was 32 ppb by mass, the arsenic concentration in the distillation still after distillation was less than 1 ppb by mass. The first fraction contained 1,700 ppb by mass of arsenic, and the main component of the arsenic was arsenic trifluoride.

Example 2

A mixture was distilled by the same method as in Example 1, except that the mixture containing arsenic compounds and tungsten hexafluoride obtained by reacting a fluorine gas with metallic tungsten was not allowed to flow in the packed column.

As a result, while the arsenic concentration in the collector before distillation was 6.5 ppb by mass, the arsenic concentration in the distillation still after distillation was 3.4 ppb by mass, and the first fraction contained 1.7 ppb by mass of arsenic, which showed that both the still residue and first fraction contained arsenic. Presumably, because the inside of the collector was degassed at −50° C., $AsF_5$ was removed to some extent, and the arsenic concentration in the collector before distillation in Reference Example 1 is lower than the arsenic concentration in Example 1.

Comparative Example 1

A mixture containing arsenic compounds and tungsten hexafluoride obtained by reacting a fluorine gas with metallic tungsten and a fluorine gas were allowed to flow at 1.5 NL/min in an 80 mm (φ)×700 mm nickel reactor heated to 350° C. with an external heater. The gas allowed to flow was collected into a stainless steel trap cooled to −50° C. After about 1.3 kg of tungsten hexafluoride was allowed to flow, the gas in the trap was removed at a temperature of −50° C. in a vacuum. Then, an operation of filling the trap with helium up to atmospheric pressure and performing vacuum degassing for 10 minutes was repeated 5 times. The internal temperature of the trap was returned to room temperature so that the mixture (gas) containing tungsten hexafluoride and arsenic compounds other than a trivalent arsenic compound turned into a liquid, and then the mixture was distilled by the same method as in Example 1.

As a result, it was confirmed that while the still residue contained arsenic, the first fraction did not contain arsenic.

It has been confirmed that the tungsten hexafluoride manufacturing method in Examples 1 and 2 further reduces the content of arsenic in the still residue compared to the manufacturing method in Comparative Example 1, and makes it possible to obtain high-purity tungsten hexafluoride.

This application claims a priority based on Japanese Patent Application No. 2019-056044 filed on Mar. 25, 2019, the entire content of which is incorporated into the present specification.

The invention claimed is:

1. A method of manufacturing tungsten hexafluoride, comprising:
a reaction step comprising reacting tungsten containing arsenic or an arsenic compound with a gas of a fluorine element-containing compound, so as to obtain a mixture comprising tungsten hexafluoride and a trivalent arsenic compound; and
a distillation step comprising distilling and purifying the mixture so as to separate and remove a first fraction comprising the trivalent arsenic compound and to obtain tungsten hexafluoride.

2. The method of manufacturing tungsten hexafluoride according to claim 1,
wherein the reaction step further comprises reacting the tungsten containing arsenic or an arsenic compound with the gas of a fluorine element-containing compound, so as to obtain an intermediate product containing a pentavalent arsenic compound and tungsten hexafluoride, and a step of bringing the intermediate product into contact with a reducing substance so as to convert at least a part of the pentavalent arsenic compound into a trivalent arsenic compound and to obtain the mixture.

3. The method of manufacturing tungsten hexafluoride according to claim 2,
wherein the reducing substance comprises at least one substance selected from the group consisting of tungsten, molybdenum, copper, nickel, iron, cobalt, zinc, titanium, aluminum, calcium, magnesium, phosphorus, and hydrogen.

4. The method of manufacturing tungsten hexafluoride according to claim 2,
wherein the intermediate product and the reducing substance are brought into contact with each other under a temperature condition of 100° C. to 500° C.

5. The method of manufacturing tungsten hexafluoride according to claim 1,
wherein an amount of the first fraction separated and removed is 0.1% by mass to 5% by mass with respect to a feed amount of 100% by mass of the tungsten hexafluoride subjected to the distillation step.

6. The method of manufacturing tungsten hexafluoride according to claim 1, further comprising, after the distillation step:
a filling step of vaporizing the tungsten hexafluoride and filling a storage container with the tungsten hexafluoride.

7. The method of manufacturing tungsten hexafluoride according to claim 1,
wherein the trivalent arsenic compound comprises arsenic trifluoride.

8. The method of manufacturing tungsten hexafluoride according to claim 1,
wherein in the distillation step, the first fraction is separated and removed to obtain tungsten hexafluoride satisfying the following condition:
a content of the trivalent arsenic compound in the tungsten hexafluoride obtained after the distillation step is equal to or less than 100 ppb by mass in terms of arsenic atoms.

9. The method of manufacturing tungsten hexafluoride according to claim 1,
wherein the distillation step is performed with a distillation apparatus comprising a distillation column.

10. The method of manufacturing tungsten hexafluoride according to claim 9,
wherein the tungsten hexafluoride is refluxed in the distillation column.

11. The method of manufacturing tungsten hexafluoride according to claim 1,
wherein the tungsten hexafluoride obtained after the distillation step is used as a raw material gas for chemical vapor deposition (CVD).

12. A method of manufacturing tungsten hexafluoride, comprising:
a reaction step comprising reacting tungsten containing arsenic or an arsenic compound with a gas of a fluorine element-containing compound, so as to obtain an intermediate product comprising a pentavalent arsenic compound and tungsten hexafluoride, and a step of bringing the intermediate product into contact with a reducing substance so as to convert at least a part of the pentavalent arsenic compound into a trivalent arsenic compound and to obtain a mixture; and
a distillation step comprising distilling and purifying the mixture so as to separate and remove a fraction comprising the trivalent arsenic compound and to obtain tungsten hexafluoride.

13. The method of manufacturing tungsten hexafluoride according to claim 12,
wherein the reducing substance comprises at least one substance selected from the group consisting of tungsten, molybdenum, copper, nickel, iron, cobalt, zinc, titanium, aluminum, calcium, magnesium, phosphorus, and hydrogen.

14. The method of manufacturing tungsten hexafluoride according to claim 12,
wherein the intermediate product and the reducing substance are brought into contact with each other under a temperature condition of 100° C. to 500° C.

15. The method of manufacturing tungsten hexafluoride according to claim 12,
wherein an amount of the first fraction separated and removed is 0.1% by mass to 5% by mass with respect to a feed amount of 100% by mass of the tungsten hexafluoride subjected to the distillation step.

16. The method of manufacturing tungsten hexafluoride according to claim 12, further comprising, after the distillation step:
a filling step of vaporizing the tungsten hexafluoride and filling a storage container with the tungsten hexafluoride.

17. The method of manufacturing tungsten hexafluoride according to claim 12,
wherein the trivalent arsenic compound comprises arsenic trifluoride.

18. The method of manufacturing tungsten hexafluoride according to claim 12,
wherein in the distillation step, the first fraction is separated and removed to obtain tungsten hexafluoride satisfying the following condition:

a content of the trivalent arsenic compound in the tungsten hexafluoride obtained after the distillation step is equal to or less than 100 ppb by mass in terms of arsenic atoms.

19. The method of manufacturing tungsten hexafluoride according to claim 12,
wherein the distillation step is performed with a distillation apparatus comprising a distillation column.

20. The method of manufacturing tungsten hexafluoride according to claim 19,
wherein the tungsten hexafluoride is refluxed in the distillation column.

\* \* \* \* \*